(12) United States Patent
Chen et al.

(10) Patent No.: US 7,046,719 B2
(45) Date of Patent: May 16, 2006

(54) SOFT HANDOFF BETWEEN CELLULAR SYSTEMS EMPLOYING DIFFERENT ENCODING RATES

(75) Inventors: Jiangnan Chen, Darien, IL (US); Ron Rotstein, Arlington Heights, IL (US); Yuda Luz, Buffalo Grove, IL (US); Louay A Jalloul, Campbell, CA (US)

(73) Assignee: Motorola, Inc., Schaumburg, IL (US)

( * ) Notice: Subject to any disclaimer, the term of this patent is extended or adjusted under 35 U.S.C. 154(b) by 867 days.

(21) Appl. No.: 09/801,891

(22) Filed: Mar. 8, 2001

(65) Prior Publication Data

US 2002/0154682 A1   Oct. 24, 2002

(51) Int. Cl.
*H04B 15/00* (2006.01)
*H04K 1/00* (2006.01)
*H04L 27/30* (2006.01)

(52) U.S. Cl. ............... 375/147; 375/375; 375/349; 714/796

(58) Field of Classification Search ........... 375/130, 375/147, 150, 262, 341, 349; 714/796
See application file for complete search history.

(56) References Cited

U.S. PATENT DOCUMENTS

| | | | |
|---|---|---|---|
| 3,802,967 A | 4/1974 | Landany et al. | 148/171 |
| 4,404,265 A | 9/1983 | Manasevit | 428/689 |
| 4,482,906 A | 11/1984 | Hovel et al. | 357/16 |
| 4,523,211 A | 6/1985 | Morimoto et al. | 357/4 |
| 4,661,176 A | 4/1987 | Manasevit | 148/175 |
| 4,846,926 A | 7/1989 | Kay et al. | 156/612 |
| 4,882,300 A | 11/1989 | Inoue et al. | 437/236 |
| 4,891,091 A | 1/1990 | Shastry | 156/606 |
| 4,912,087 A | 3/1990 | Aslam et al. | 505/1 |
| 4,928,154 A | 5/1990 | Umeno et al. | 357/16 |
| 4,933,956 A * | 6/1990 | Forney, Jr. | 375/341 |
| 4,963,949 A | 10/1990 | Wanlass et al. | 357/16 |
| 4,999,842 A | 3/1991 | Huang et al. | 372/45 |
| 5,141,894 A | 8/1992 | Bisaro et al. | 437/132 |
| 5,155,658 A | 10/1992 | Inam et al. | 361/321 |

(Continued)

FOREIGN PATENT DOCUMENTS

EP         0342937         11/1989

(Continued)

OTHER PUBLICATIONS

"Oriented Growth of SrTiO$_3$ Films on Si(100) Substrates Using in situ Cleaning by Excited Hydrogen," H. Ishiwara et al., Mat. Res. Soc. Symp., vol. 116, 1988., pp. 369-374.

(Continued)

*Primary Examiner*—Jean B. Corrielus
(74) *Attorney, Agent, or Firm*—Simon B. Anolick

(57) ABSTRACT

A receiver (200) is provided receiving signals from differing base stations ($BTS_A$ and $BTS_B$). The signal from $BTS_A$ is encoded using a first rate convolutional encoder while the signal transmitted from $BTS_B$ is encoded using a second rate convolutional encoder. Since the multiple base station links may result in a different number of symbols being received for each bit transmitted, the symbols received for each link cannot be simply combined. Therefore, in the preferred embodiment of the present invention, the resulting symbols are passed to multiple branch metric circuits (210–211), where branch metrics ($\mu_i$) for the symbols are obtained. After the $i^{th}$ branch metrics for the base stations are computed, the branch metrics for each base station are passed to a combiner (212) where they are combined.

14 Claims, 6 Drawing Sheets

U.S. PATENT DOCUMENTS

| | | | | |
|---|---|---|---|---|
| 5,159,413 | A | 10/1992 | Calviello et al. | 505/1 |
| 5,173,474 | A | 12/1992 | Connell et al. | 505/1 |
| 5,202,903 | A * | 4/1993 | Okanoue | 375/347 |
| 5,221,367 | A | 6/1993 | Chisholm et al. | 148/33 |
| 5,225,031 | A | 7/1993 | McKee et al. | 156/612 |
| 5,248,564 | A | 9/1993 | Ramesh | 428/688 |
| 5,270,298 | A | 12/1993 | Ramesh | 505/1 |
| 5,310,707 | A | 5/1994 | Oishi et al. | 501/126 |
| 5,326,721 | A | 7/1994 | Summerfelt | 437/131 |
| 5,358,925 | A | 10/1994 | Neville Connell et al. | 505/235 |
| 5,393,352 | A | 2/1995 | Summerfelt | 148/33.3 |
| 5,418,216 | A | 5/1995 | Fork | 505/473 |
| 5,418,389 | A | 5/1995 | Watanabe | 257/295 |
| 5,450,812 | A | 9/1995 | McKee et al. | 117/84 |
| 5,453,997 | A * | 9/1995 | Roney, IV | 714/774 |
| 5,478,653 | A | 12/1995 | Guenzer | 428/446 |
| 5,482,003 | A | 1/1996 | McKee et al. | 117/108 |
| 5,514,484 | A | 5/1996 | Nashimoto | 428/700 |
| 5,556,463 | A | 9/1996 | Guenzer | 117/90 |
| 5,588,995 | A | 12/1996 | Sheldon | 117/201 |
| 5,608,737 | A * | 3/1997 | Kimura et al. | 714/746 |
| 5,638,408 | A * | 6/1997 | Takaki | 375/341 |
| 5,670,798 | A | 9/1997 | Schetzina | 257/96 |
| 5,674,366 | A | 10/1997 | Hayashi et al. | 204/298.09 |
| 5,701,333 | A * | 12/1997 | Okanoue et al. | 375/347 |
| 5,731,220 | A | 3/1998 | Tsu et al. | 437/60 |
| 5,735,949 | A | 4/1998 | Mantl et al. | 117/8 |
| 5,741,724 | A | 4/1998 | Ramdani et al. | 437/128 |
| 5,757,844 | A * | 5/1998 | Fukawa et al. | 375/136 |
| 5,757,850 | A * | 5/1998 | Takaki | 375/225 |
| 5,796,757 | A * | 8/1998 | Czaja | 714/789 |
| 5,801,105 | A | 9/1998 | Yano et al. | 438/785 |
| 5,810,923 | A | 9/1998 | Yano et al. | 117/84 |
| 5,828,080 | A | 10/1998 | Yano et al. | 257/43 |
| 5,830,270 | A | 11/1998 | McKee et al. | 117/106 |
| 5,874,860 | A | 2/1999 | Brunel et al. | 330/285 |
| 5,912,068 | A | 6/1999 | Jia | 428/210 |
| 5,916,315 | A * | 6/1999 | Ryan | 714/786 |
| 5,978,365 | A | 11/1999 | Yi | |
| 5,999,815 | A | 12/1999 | TenBrook et al. | 455/436 |
| 6,002,375 | A | 12/1999 | Corman et al. | 343/853 |
| 6,012,160 | A * | 1/2000 | Dent | 714/786 |
| 6,045,626 | A | 4/2000 | Yano et al. | 148/33.4 |
| 6,055,179 | A | 4/2000 | Koganei et al. | 365/158 |
| 6,064,078 | A | 5/2000 | Northrup et al. | 257/96 |
| 6,103,008 | A | 8/2000 | McKee et al. | 117/2 |
| 6,107,653 | A | 8/2000 | Fitzgerald | 257/191 |
| 6,108,317 | A * | 8/2000 | Jones et al. | 370/320 |
| 6,113,690 | A | 9/2000 | Yu et al. | 117/84 |
| 6,143,072 | A | 11/2000 | McKee et al. | 117/8 |
| 6,327,316 | B1 * | 12/2001 | Ikeda | 375/341 |
| 6,378,107 | B1 * | 4/2002 | Yoshinaka | 714/795 |
| 6,487,255 | B1 * | 11/2002 | Arslan et al. | 375/262 |
| 6,574,289 | B1 * | 6/2003 | Tran et al. | 375/341 |
| 2001/0055334 | A1 * | 12/2001 | Tiedemann | 375/225 |
| 2002/0122392 | A1 * | 9/2002 | Elezabi et al. | 370/320 |
| 2003/0026359 | A1 * | 2/2003 | Loeliger et al. | 375/341 |
| 2004/0157609 | A1 * | 8/2004 | Jalloul et al. | 455/442 |

FOREIGN PATENT DOCUMENTS

| | | |
|---|---|---|
| EP | 0455526 | 6/1991 |
| EP | 0250171 | 11/1992 |
| EP | 0514018 | 11/1992 |
| EP | 0602568 | 6/1994 |
| EP | 0607435 | 7/1994 |
| EP | 0999600 | 5/2000 |
| EP | 1001468 | 5/2000 |
| GB | 1319311 | 6/1973 |
| JP | 5208835 | 7/1977 |
| JP | 5413455 | 10/1979 |
| JP | 5508742 | 7/1980 |
| JP | 6110818 | 5/1986 |
| JP | 6303499 | 2/1988 |
| JP | 6313110 | 6/1988 |
| JP | 6319836 | 8/1988 |
| JP | 2000039 | 1/1990 |
| JP | 6327862 | 1/1990 |
| JP | 5048072 | 2/1993 |
| JP | 6334168 | 6/1993 |
| JP | 6232126 | 8/1994 |
| JP | 6291299 | 10/1994 |
| JP | 1123868 | 8/1999 |
| JP | 1126083 | 9/1999 |
| WO | 9914804 | 3/1999 |
| WO | 9963580 | 12/1999 |

OTHER PUBLICATIONS

"A Preliminary Consideration of the Growth Behavior of $CeO_2$, $SrTiO_3$ and $SrVO_3$ Films on Si Substrate," Nagata et al., Thin Solid Films, 224, 1993, pp. 1-3.

"Heteroepitaxial Growth of $CeO_2(001)$ Films on Si(001) Substrates by Pulsed Laser Deposition in Ultrahigh Vacuum," Nagata et al., Jpn. J. Appl. Phys., vol. 30, No. 6b, 1991, pp. 1136-1138.

"Heteroepitaxial Growth of SrO Films on Si Substrates," Kado et al., J. Appl. Phys., 61(6), 1987, pp. 2398-2400.

"Epitaxial Growth of Perovskite Type Oxide Films on Si Substrates," H. Ishiwara et al., Mat. Res. Soc. Symp., vol. 220, 1991, pp. 595-600.

"Effects of Buffer Layers in Epitaxial Growth of $SrTiO_3$ Thin Film on Si(100)," Nakagawara et al., J. Appl. Phys. 78(12), 1995, pp. 7226-7230.

"A Proposal of Epitaxial Oxide Thin Film Structures for Future Oxide Electronics," Suzuki et al., Materials Science and Engineering B41 (1996), pp. 166-173.

"Impact of GaAs Buffer Thickness on electronic Quality of GaAs Grown on Graded Ge/GeSi/Si Substrates," Carlin et al., Appl. Phys. Letter, vol. 76, No. 14, Apr. 2000, pp. 1884-1886.

"Epitaxial Integration of III-V Materials and Devices with Si Using Graded GeSi Buffers," Ringel et al., 27th International Symposium on Compound Semiconductors, Oct. 2000.

"Progress in Compound-Semiconductor-on-Silicon-Heteroepitaxy with Fluoride Buffer Layers," Zogg et al., J. Electrochem Soc., vol. 136, No. 3, Mar. 1989, pp. 775-779.

"Oxide Defined GaAs Vertical-Cavity Surface-Emitting Lasers on Si Substrates," Xiong et al., IEEE Photonics Tech Letters, vol. 12, No. 2, Feb. 2000, pp. 110-112.

"Investigation of PZT/?LSCO/Pt//Aerogel Thin Film Composites for Uncooled Pyroelectric IR Detectors," Clem et al., Mat. Res. Soc. Symp. vol. 541, pp. 661-666.

"Bound-To-Quasi-Bound Quantum-Well Infrared Photodetectors," Gunapala et al., NASA Tech Brief, vol. 22, No. 9.

"Monolithic InGaAs-on-silicon Short Wave Infrared Detector Arrays," Joshi et al., Int'l. Society for Optical Engineering, vol. 2999, pp. 211-224.

"Nanostructure and Chemistry of a (100)Mg/(100)GaAs Interface," Bruley et al., Appl. Phys Lett. 65(5), Aug. 1994, pp. 564-566.

"Epitaxial MgO on Si(001) for Y-Ba-Cu-O Thin Film Growth by Pulsed Laser Deposition," Fork et al., Appl. Phys Lett 58(20), May 1991, pp. 2294-2296.

"Dialectrics on Semiconductors," Himpsel et al., Materials Science and Engineering, B1(1988), pp. 9-13.

"Epitaxial La 0.67 Sr 0.33 $MnO_3$ Magnetic Tunnel Junctions," J. Appl. Phys. 81(8), Apr. 1997 pp. 5509-5511.

"Colossal Magnetoresistance Magnetic Tunnel Junctions Grown by Molecular-Beam Epitaxy," O'Donnell et al., Appl. Physics Letters, bol. 76, No. 14, Apr. 2000, pp. 1914-1916.

"Integration of GaAs on Si using a spinel buffer layer, IBM Technical Bulletin," vol. 30, No. 6, Nov. 1987, p. 365.

"GaInAs Superconducting FET," IBM Technical Bulletin, vol. 36, No. 8, Aug. 1993, p. 655.

"Epitaxial 3d Structure Using Mixed Spinel," IBM Technical Bulletin, vol. 30, No. 3, Aug. 1987, p. 1271.

"Roles of Buffer Layers in Epitaxial Growth of $SrTiO_3$ Films on Silicon Substrates,"Moon et al., Japan j of Appl Phys., vol. 33, 1994. pp. 1472-1477.

"GaAs Heteroepitaxial Growth on Si Substrates with Thin Si Interlayers in Situ Annealed at High Temperatures," Yodo et al., 8257b Journal of Vacuum Science & Technology, 1995, No. 3, pp. 1000-1005.

"Substrate Effect on the Superconductivity of $Yba_2Cu_3O_7$ Thin Films," Cuomo et al., AIP conference 1988, pp. 141-148.

"Crystalline Oxides on Silicon: The First Five Monolayers," McKee et al., Physical Review Letters, vol. 81, No. 14, Oct. 1998, pp. 3104-3017.

"Molecular Beam Epitaxy Growth of Epitaxial Barium Silicide, Barium Oxidem and Barium Titanate on Silicon," McKee et al., 1991 American Institute of Physics, pp. 782-284.

"Molecular Beam Epitaxy Growth of $SrTiO_3$ Films on Si(100)-2 × 1 with SrO Buffer Layer," Tambo et al., Jpn. J. Appl. Phys., vol. 37, 1998 pp. 4454-4459.

"The MBE Growth and Optical Quality of $BaTiO_3$ and $SrTiO_3$ Thin Films on MgO," McKee et al,. Mat. Res. Soc. Symp. Proc. vol. 341, 1994, pp. 309-314.

"$BaSi_2$ and Thin Film Alkaline Earth Silicides on Silicon," McKee et al., Appl. Phys. Lett. 63 (20), Nov. 1993, pp. 2818-2820.

"Surface Structures and the Orthorhombic Transformation of Thin Film $BaSi_2$ on Silicon," McKee et al., Mat. Res. Soc. Symp. Proc. vol. 221, pp. 131-136.

"Epitaxial Growth of of $SrTiO_3$ Films on Si(100) Substrates Using a Focused Electron Beam Evaporation Method," Mori et al. Jpn. J. of Appl. Phys., vol. 30, No. 8a, Aug. 1991, pp. 1415-1417.

"Growth of Crystalline $SrTiO_3$ Films on Si Substrates Using Thin Fluoride Buffer Layers and Their Electrical Properties," Moon et al., Jpn. J. of Apl. Phys., vol. 33, (1994), pp. 5911-5916.

"The Epitactic Growth of Oxides on Si," S. Summerfelt, Materials Research Society Symposium Proceedings, vol. 221, 1991, pp. 29-34.

* cited by examiner

*FIG. 1* —PRIOR ART—

SOFT HANDOFF BETWEEN CELLULAR SYSTEMS EMPLOYING DIFFERENT ENCODING RATES

FIELD OF THE INVENTION

The present invention relates generally to cellular communication systems and in particular, to soft handoff between such systems employing different encoding rates.

BACKGROUND OF THE INVENTION

During transmission within a cellular communication system, data that is transmitted is error protected in several ways prior to transmission. One form of error protection is convolutional encoding. During encoding, a convolutional encoder encodes input data bits into data symbols at a fixed encoding rate (r) with an encoding algorithm which facilitates subsequent maximum likelihood decoding of the data symbols into data bits (e.g. convolutional or block coding algorithms). For example, a convolutional encoder encodes input data bits (received at a particular bit rate) at a fixed encoding rate of one data bit to n data symbols (rate 1/n) such that the convolutional encoder outputs data symbols at a n*r ksymbol/second rate.

Such a convolutional encoder is illustrated in FIG. 1. The memory of encoder 100 is characterized by its state, which is represented as a v-bit binary number $X = x_0 x_1 \ldots x_{v-1}$. For every input bit, the encoder outputs n bits based on the input and v state bits, and then transitions to a next state. More particularly, for every bit that enters the encoder, that bit is stored in the leftmost memory location, and all pre-stored bits are shifted to the right. Two calculations ($g_0$ and $g_1$) are made each bit time by exclusive OR'ing the contents of the specified shift register locations as shown.

Currently $2^{nd}$ generation Code Division Multiple Access (CDMA) systems utilize a rate ½ convolutional encoding on the downlink, and a rate ¼ convolutional encoding on the uplink, while $3^{rd}$ Generation systems can utilize ⅓, ¼, or ⅙ rate convolutional encoding. A problem exists when a mobile unit with $2^{nd}$ Generation and $3^{rd}$ Generation capabilities (dual mode) is in inter-system soft handoff between systems employing two differing encoding rates. In such a system the combining of multiple forward links cannot be accomplished. This is because different encoder rates of the multiple air interface systems produce a different number of encoded symbols (with the same encoder constraint length K, for example K=9), which cannot be combined. Therefore, a need exists for a method and apparatus for performing soft handoff between systems employing different encoding rates.

DETAILED DESCRIPTION OF THE DRAWINGS

Figure 1:
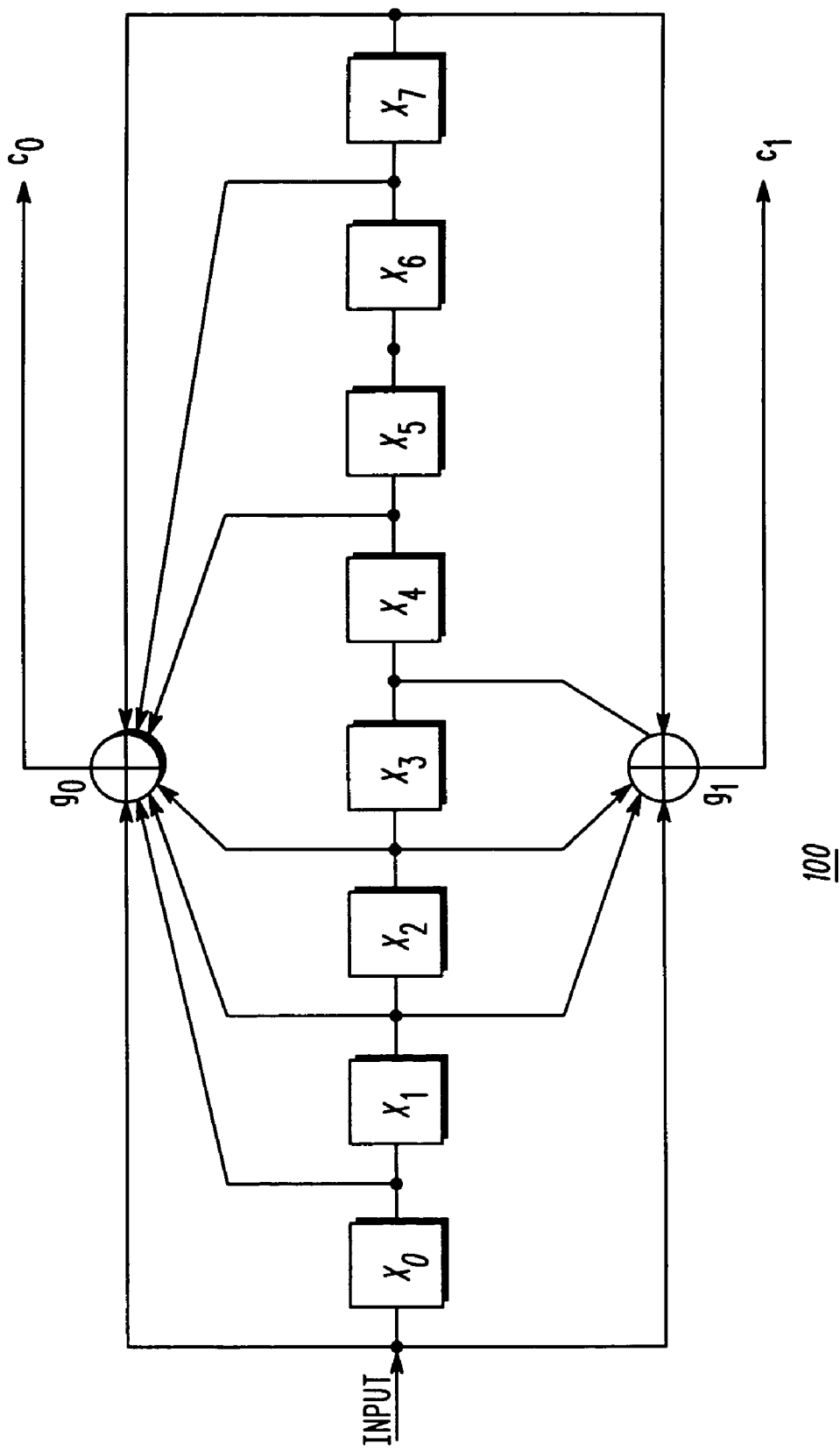
FIG. 1 is a block diagram of a prior art convolutional encoder.

To address the above-mentioned need soft handoff between cellular systems employing different encoding rates is provided herein. A receiver is provided receiving signals from differing base stations ($BTS_A$ and $BTS_B$). The signal from $BTS_A$ is encoded using a first rate convolutional encoder while the same signal transmitted from $BTS_B$ is encoded using a second rate convolutional encoder. Since the multiple base station links may result in a different number of symbols being received for each bit transmitted, the symbols received for each link cannot be simply combined. Therefore, in the preferred embodiment of the present invention, the resulting symbols are passed to multiple branch metric circuits, where branch metrics ($\mu_i$) for the symbols are obtained. After the $i^{th}$ branch metrics for the base stations are computed, the branch metrics for each base station are passed to a combiner where they are combined.

Because the branch metrics from each of the base stations are added together to form a combined branch metric, the diversity combining gains of soft handoff can be achieved for inter-system (generation) soft handoff. This allows for the diversity benefit of soft handoff to be achieved for systems employing different convolutional encoding schemes.

The present invention encompasses an apparatus comprising a first signal path and a second signal path. The first signal path comprises a first despreader, a second despreader coupled to the first despreader, a first de-interleaver coupled to the second despreader, a first branch metric determiner coupled to the first de-interleaver, wherein the first branch metric determiner outputs first branch metrics. The second signal path comprises a third despreader, a fourth despreader coupled to the third despreader, a second de-interleaver coupled to the fourth despreader, a second branch metric determiner coupled to the second de-interleaver, wherein the second branch metric determiner outputs second branch metrics. Finally, the apparatus includes a combiner having the first and the second branch metrics as an input and outputting combined branch metrics.

The present invention additionally encompasses an apparatus comprising a first branch metric generator having a first plurality of symbols as an input and outputting first branch metrics for the first plurality of symbols, a second branch metric generator having a second plurality of symbols as an input and outputting second branch metrics for the second plurality of symbols, and a combiner having the first and the second branch metrics as an input and outputting combined branch metrics.

The present invention additionally encompasses a method. The method comprises the steps of receiving a first plurality of symbols, and generating first branch metrics for the first plurality of symbols. A second plurality of symbols is received and second branch metrics are generated for the second plurality of symbols. Finally the first and the second branch metrics are combined.

The description of the preferred and alternate embodiments will be given below with respect to functionality existing within a mobile unit receiver. One or ordinary skill in the art will recognize, however, that the preferred and alternate embodiments may be implemented within cellular infrastructure equipment receivers (e.g., a base station receivers) as well.

Figure 2:
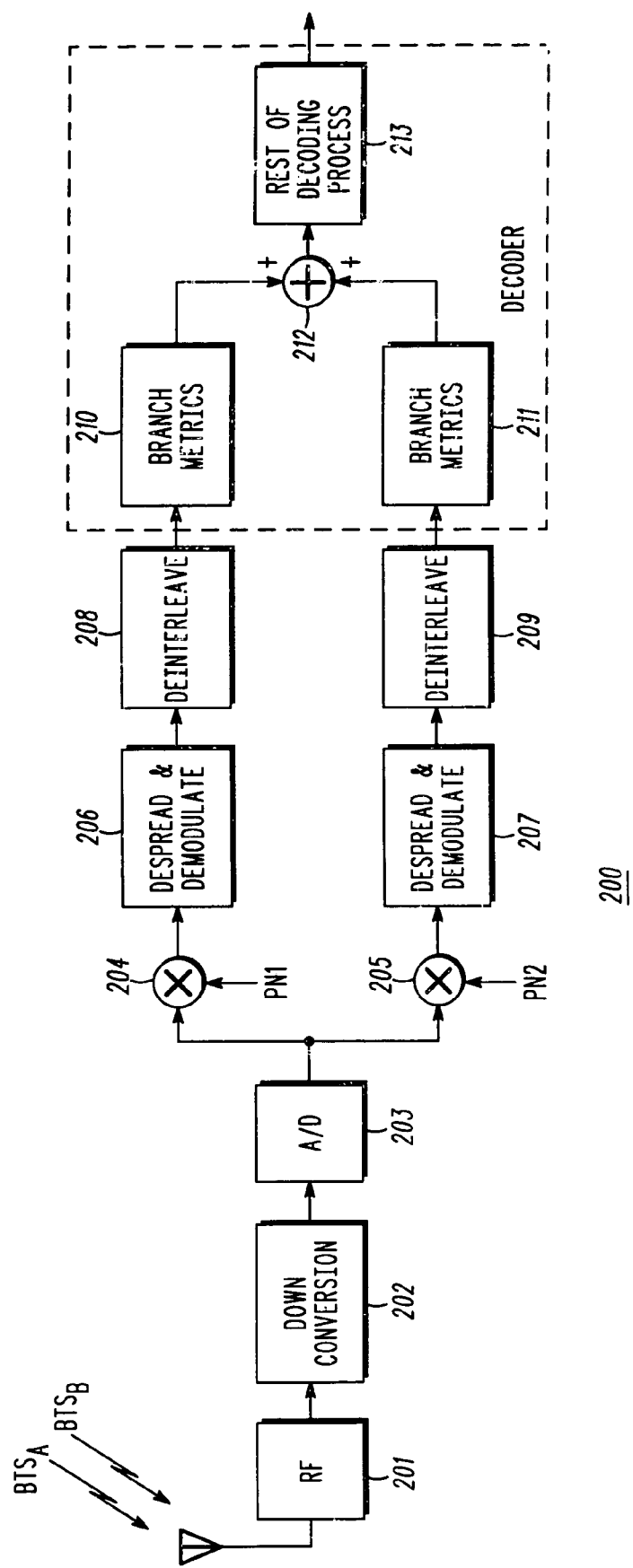
FIG. 2 is a block diagram of a mobile receiver in accordance with the preferred embodiment of the present invention.

Turning now to the drawings, wherein like numerals designate like components, FIG. 2 is a block diagram of receiver 200 in accordance with the preferred embodiment of the present invention. As shown, receiver 200 is receiving two signals from differing base stations ($BTS_A$ and $BTS_B$). For the purposes of the following discussion, the signal from $BTS_A$ is encoded using a first rate convolutional encoder while the signal transmitted from $BTS_B$ is encoded using a second rate convolutional encoder. The signal is received at RF front end 201 and is down converted via down converter 202. The down converted signal is passed through analog to digital (A/D) circuitry 203 where it is converted into a digital format. The resulting digital signal is split into two signal paths (first and second) where despreading operations take place. In particular a first and a second Pseudo-Noise (PN) code is applied to each of the signal paths via mixers (despreaders) 204–205. The despread signal is further despread and de-modulated via despreaders 206–207. More particularly, cell and channel-specific spreading codes are utilized to despread the signal to recover the transmitted information. The first despreader 204 despreads data transmitted from the first base station ($BTS_A$) while the second despreader 205 despreads data transmitted from the second base station ($BTS_B$).

The transmitted information is de-interleaved by de-interleavers 208–209 resulting in demodulated symbols for the different links. More particularly, for each bit that was transmitted by $BTS_A$ using a rate $\frac{1}{n}$, encoder, n symbols ($r_1^A$, $r_2^A$, ..., $r_n^A$) are eventually output by the de-interleaver. For example, if $BTS_A$ is utilizing a rate $\frac{1}{3}$ convolutional encoder, then the de-interleaver receiving the signal for $BTS_A$ would output three symbols ($r_1^A$, $r_2^A$, $r_3^A$). As discussed above, since the multiple base station links may result in a different number of symbols being received for each bit transmitted, the symbols received for each link cannot be simply combined. Therefore, in the preferred embodiment of the present invention, the resulting symbols are passed to multiple branch metric determiners (circuits 210–211), where branch metrics ($\mu_i$) for the symbols are obtained.

The generation of branch metrics is well known in the art, and are generally calculated as $$\mu_i = \sum_{i=1}^{n} s_{ij} r_{ij}$$

where n=1, 2, 3, ... is the number of the encoded symbols at the output of the encoder corresponding to one input bit;

$s_{ij}$=+/−1, is the $j^{th}$ symbol of the output of the convolutional encoder for the $i^{th}$ state (or branch)

$r_{ij}$=is the $j^{th}$ symbol of the received sequence for the $i^{th}$ branch (or state) of the convolutional decoder and i represents the $i^{th}$ state (or branch) of the decoder.

For example, for three-way intersystem soft handoff where base stations A, B, and C are using ½, ⅓, and ¼ rate convolutional encoding, respectively, the branch metrics for the $i^{th}$ branch for base stations A, B, and C would be:

$$\mu_i^A = s_{i1}^A * r_{i1}^A + s_{i2}^A * r_{i2}^A,$$

-continued
$$\mu_i^B = s_{i1}^B * r_{i1}^B + s_{i2}^B * r_{i2}^B + s_{i3}^B * r_{i3}^B,$$

$$\mu_i^C = s_{i1}^C * r_{i1}^C + s_{i2}^C * r_{i2}^C + s_{i3}^C * r_{i3}^C + s_{i4}^C * r_{i4}^C,$$

Thus, in accordance with the preferred embodiment of the present invention first branch metric determiner 210 generates branch metrics for symbols generated utilizing a first encoding scheme, while second branch metric determiner 211 generates branch metrics for symbols generated utilizing a second encoding scheme.

After the $i^{th}$ branch metrics for the base stations are computed, the branch metrics for each base station are passed to combiner 212 where they are combined and output. More particularly the final branch metric for the $i^{th}$ branch would be output as $$\mu_i = m_i^A + m_i^B + m_i^C.$$

Because the branch metrics from each of the base stations are added together to form a combined branch metric, the diversity combining gains of soft handoff can be achieved for inter-system (generation) soft handoff.

After summing, the summed metrics are passed on for further decoding. The decoding process is well known in the art and utilizes a Viterbi Algorithm as described in Digital Communications Fundamentals and Applications, N.J., Prentice Hall, 1988.

Figure 3:
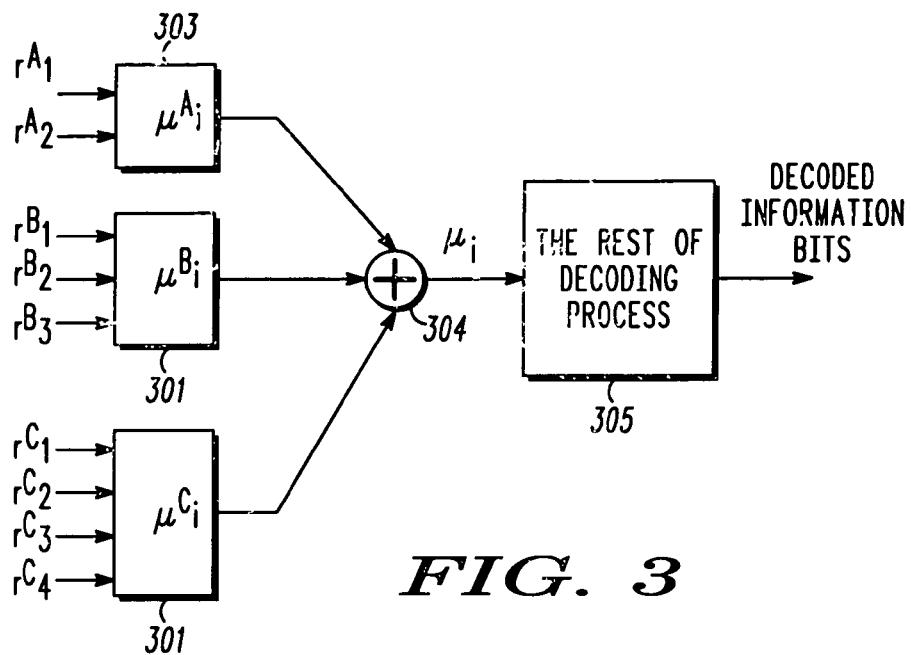
FIG. 3 is a block diagram of the decoder of FIG. 2 in accordance with the preferred embodiment of the present invention.

It should be noted that in the preceding discussion reception of two and three signals transmitted from two and three base stations was described. One of ordinary skill in the art will recognize that the present invention can be applied to reception of more than three signals from multiple sources (i.e., base stations or mobile units). In the situation where more than three signals are being received, the receiver will require an additional signal branch for each signal received. In particular, if three signals are being received from three differing base stations, the receiver of FIG. 2 will require the addition of another signal branch to produce branch metrics for the third base station. The branch metrics from the third base station will be combined with the branch metrics from the other base stations via combiner 212. This is illustrated in FIG. 3 where a block diagram of the decoder of FIG. 2 is shown. As shown in FIG. 3, three branch metric generators 301–303 are receiving symbols from three base stations (A, B, and C). As is evident, base station A utilizes a rate ½ convolutional encoder while base stations B and C utilize rate ⅓ and ¼ encoders, respectively. As shown, branch metric generators 301–303 generate branch metrics for the input symbols and outputs the branch metrics to combiner 304. Combiner 304 combines branch metrics from each of the receiver's receive paths. This allows for the diversity combining gains of soft handoff for inter-system (generation) soft handoff. More particularly, because branch metrics are determined prior to combining the receive paths, the receiver is capable of combining signals that are encoded with varying convolutional encoding rates.

Figure 4:
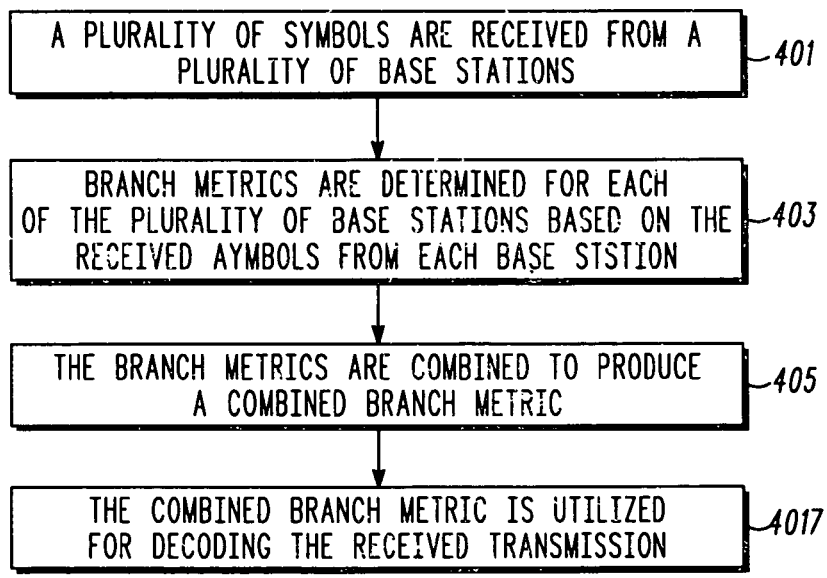
FIG. 4 is a flow chart showing operation of the decoder of FIG. 3 in accordance with the preferred embodiment of the present invention.

FIG. 4 is a flow chart showing operation of the decoder of FIG. 3 in accordance with the preferred embodiment of the present invention. The logic flow begins at step 401 where a plurality of symbols is received from a plurality of base stations. In the preferred embodiment of the present invention the symbols from each base station are transmitted utilizing a differing convolutional encoding scheme for the same information sequence. In particular, each encoder from the plurality of base stations utilizes a differing encoding rate. At step 403 branch metrics are determined for each of the plurality of base stations based on the received symbols from each base station. In particular, the symbols received from a first base station are utilized to determine branch metrics for the first base station, while the symbols received from a second base station are utilized to determine branch metrics for the second base station. After the branch metrics of the plurality of base stations are determined, the branch metrics are combined to produce a combined branch metric (step 405). Finally, at step 407 the combined branch metric is utilized for decoding the received transmission.

In certain situations the frame structure will differ based on what convolutional encoding rate is being utilized. For example, the ¼ and ⅛ frame of IS-95A/B do not have cyclic redundancy check bits (CRC bits), while the IS-2000 standard requires a 6 bit CRC for both ¼ and ⅛ frames. Because of this, the simple combining of the frames by combiner 304 cannot be accomplished. In order to solve this problem, logic circuitry is provided in an alternate embodiment.

Figure 5:
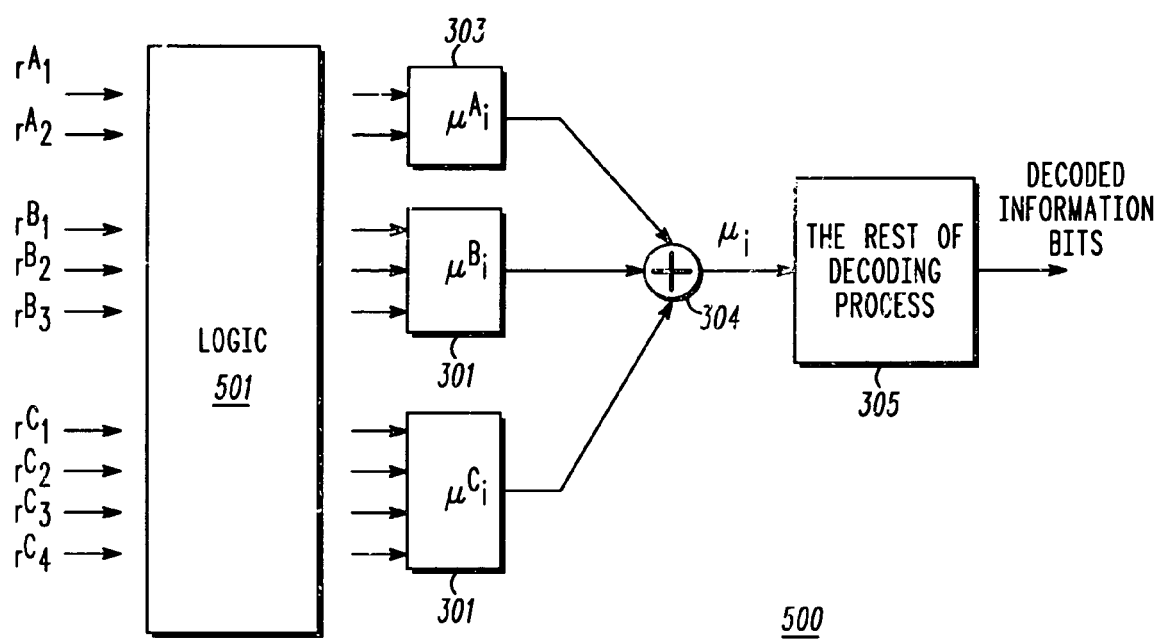
FIG. 5 is a block diagram of a decoder in accordance with an alternate embodiment of the present invention.
Figure 6:
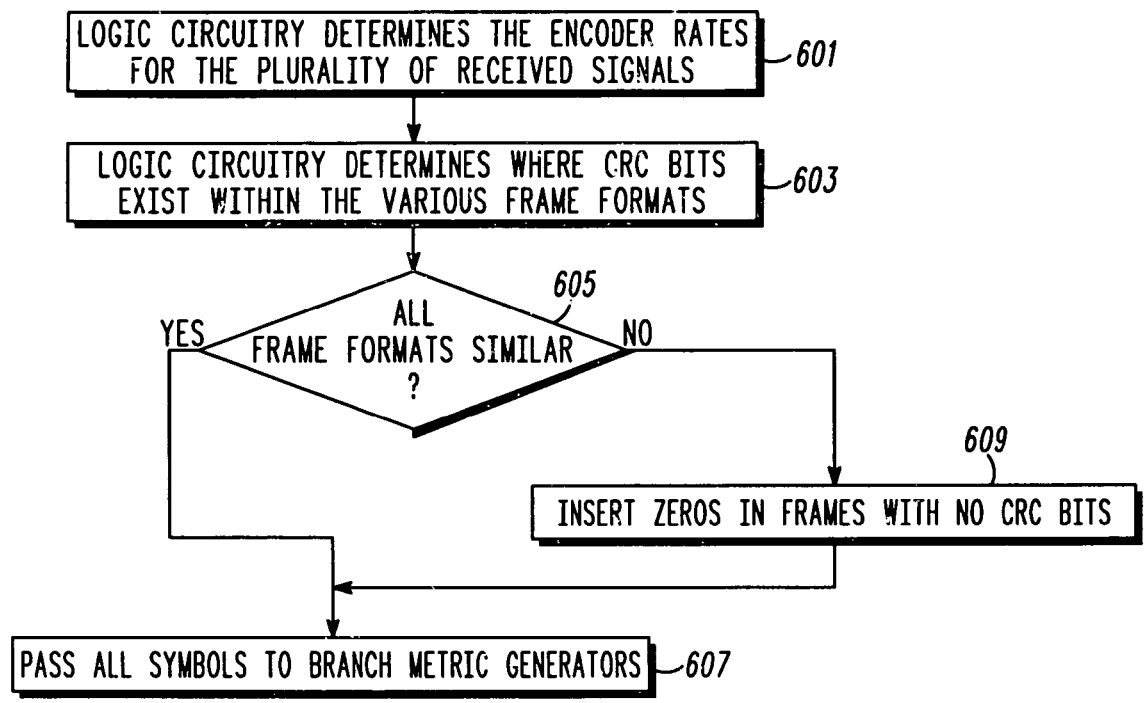
FIG. 6 is a flow chart showing operation of the decoder of FIG. 5 in accordance with the alternate embodiment of the present invention.

In the alternate embodiment the logic circuitry expands frames with no CRC bits by inserting zeroes where the CRC bits for the next-generation protocol should exist. FIG. 5 is a block diagram of decoder 500 in accordance with an alternate embodiment of the present invention. As shown, logic circuitry 501 has been inserted prior to branch metric generators 301–303. Logic circuitry 501 serves to insert zeros into the received frames at various time periods. Operation of decoder 500 in accordance with the alternate embodiment of the present invention occurs as shown in FIG. 6.

The logic flow begins at step 601 where logic circuitry 501 determines the encoder rates for the plurality of received signals. At step 603 it is determined where CRC bits exist within the various frame formats. The logic flow continues to step 605 where it is determined if all frame formats are similar, and if so the logic flow continues to step 607 where the received symbols are passed to branch metric generators 301–303. If, however, it is determined that the frame formats for the received frames are different, then the logic flow continues the step 609 where logic unit 501 inserts zeros in frames having no CRC bits. The logic flow continues to step 607.

Figure 7:
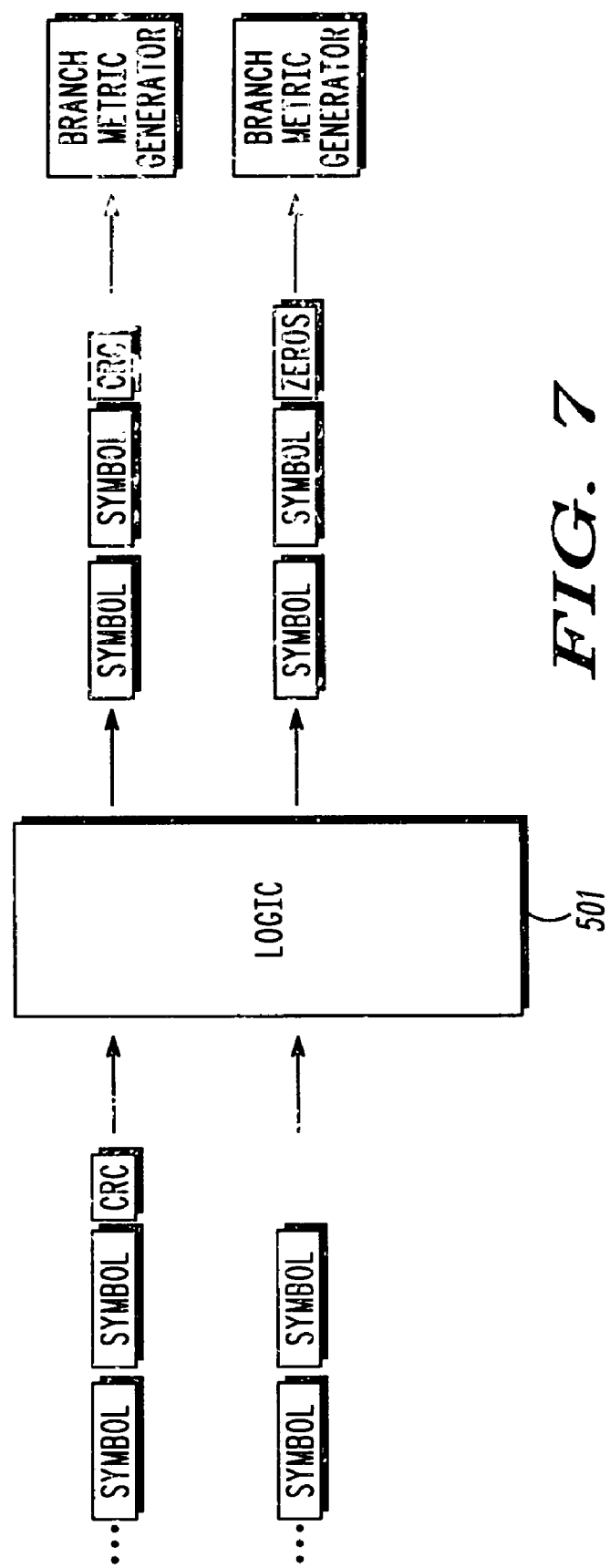
FIG. 7 is a block diagram of the operatiom of the logic unit used in accordance with an embodiment of the present invention.

In the alternate embodiment of the present invention the number of CRC bits inserted into the frame is determined by the frame formats for those frames having CRC bits. For example, if a frame comprises 6 CRC bits, then logic unit 501 will insert 6 zeros into the appropriate spot in those frames with no CRC bits so that the frames may be properly combined. Such insertion is illustrated in FIG. 7. As shown, a frame received from $BTS_A$ has 6 CRC bits entering logic unit 501, and the frame received from $BTS_B$ has no CRC bits. In the alternate embodiment of the present invention, logic unit 501 will insert 6 zeros into the appropriate spot in the frame received from $BTS_B$.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. An apparatus comprising:
   a first signal path for signals that are encoded at a first encoding rate comprising:
   a first despreader;
   a second despreader coupled to the first despreader;
   a first de-interleaver coupled to the second despreader;
   a first branch metric determiner coupled to the first de-interleaver,
      wherein the first branch metric determiner outputs first branch metrics utilizing a first encoding scheme;
   a second signal path for signals that are encoded at a second encoding rate comprising:
   a third despreader;
   a fourth despreader coupled to the third despreader;
   a second de-interleaver coupled to the fourth despreader;
   a second branch metric determiner coupled to the second de-interleaver, wherein the second branch metric determiner
   outputs second branch metrics utilizing a second encoding scheme; and
   a combiner having the first and the second branch metrics as an input and outputting combined branch metrics of the first and the second encoding schemes.

2. The apparatus of claim 1 wherein the first despreader despreads data transmitted from a first base station.

3. The apparatus of claim 2 wherein the third despreader despreads data transmitted from a second base station.

4. An apparatus comprising:
   a first branch metric generator having a first plurality of symbols that are encoded at a first encoding rate as an input and outputting first branch metrics for the first plurality of symbols;
   a second branch metric generator having a second plurality of symbols that are encoded at a second encoding rate as an input and outputting second branch metrics for the second plurality of symbols; and
   a combiner having the first and the second branch metrics as an input and outputting combined branch metrics of the first and the second encoding rates.

5. The apparatus of claim 4 wherein the first plurality of symbols differ in number from the second plurality of symbols.

6. The apparatus of claim 4 wherein the first plurality of symbols where transmitted by a first base station and the second plurality of symbols where transmitted by a second base station.

7. The apparatus of claim 4 further comprising:
   a logic unit having the first and the second plurality of symbols as an input and outputting the symbols with zeros inserted at various time periods.

8. The apparatus of claim 4 wherein the first branch metrics are branch metrics derived utilizing a first convolutional encoding scheme.

9. The apparatus of claim 8 wherein the second branch metrics are branch metrics derived utilizing a second convolutional encoding scheme.

10. A method for receiving a plurality of signals, wherein each signal of the plurality of signals employs a different encoding rate comprising the steps of:
    receiving a first plurality of symbols that are encoded at a first encoded rate;
    generating first branch metrics for the first plurality of symbols;
    receiving a second plurality of symbols that are encoded at a second encoded rate;
    generating second branch metrics for the second plurality of symbols; and
    combining the first and the second branch metrics; and
    outputting combined branch metrics of the first and the second encoding rates.

11. The method of claim 10 wherein the first plurality of symbols where are transmitted by a first base station.

12. The method of claim 11 wherein the second plurality of symbols are transmitted by a second base station.

13. The method of claim 10 wherein the first branch metrics are branch metrics derived utilizing a first convolutional encoding scheme.

14. The method of claim 13 wherein the second branch metrics are branch metrics derived utilizing a second convolutional encoding scheme.

* * * * *